July 21, 1959   J. H. AUER, JR., ET AL   2,896,068
ELECTRONIC TRACK CIRCUIT FOR RAILROADS
Filed Oct. 5, 1955
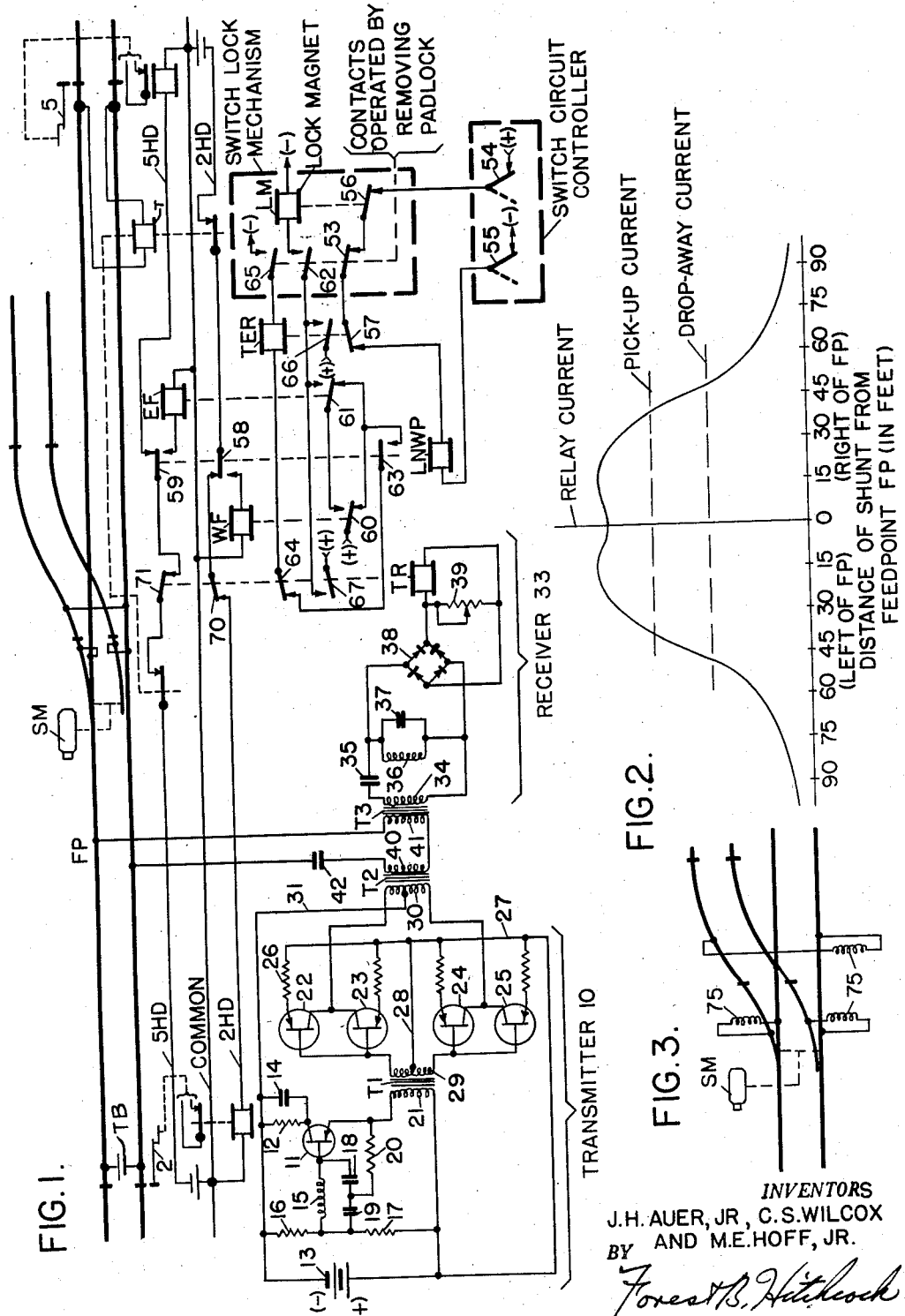
INVENTORS
J.H. AUER, JR., C.S. WILCOX
AND M.E. HOFF, JR.
BY Forest B. Hitchcock
THEIR ATTORNEY

United States Patent Office 2,896,068
Patented July 21, 1959

2,896,068

ELECTRONIC TRACK CIRCUIT FOR RAILROADS

John H. Auer, Jr., and Clinton S. Wilcox, Rochester, and Marcian E. Hoff, Jr., Spencerport, N.Y., assignors to General Railway Signal Company, Rochester, N.Y.

Application October 5, 1955, Serial No. 538,552

4 Claims. (Cl. 246—34)

This invention relates to railway signaling systems and more particularly pertains to an electronic track circuit organization.

It is at times desirable to provide means for detecting the presence of railway vehicles that is independent of the usual track circuit organization. Such an auxiliary or "overlay" track circuit can be used to provide for the unlocking of a remote track switch, for example. It can also be used in place of the series track relay often used in signaling systems for indicating the approach of a train, or it can be used to indicate the approach of a train in a highway crossing protection system. By having such an auxiliary track circuit independent of the usual track circuit, it is not necessary to provide the insulated joints that are ordinarily required when a short detector track section of the usual kind is employed. Another advantage, particularly when coded track circuits are used, is that the independent auxiliary track circuit eliminates the need for repeating coded information appearing in the track rails around the detector track circuit. This is especially advantageous in systems employing self-coding of the rail current because, in such systems, the increased resistance resulting from the use of electric cable around the detector track section adversely affects the operation of the system.

The overlay track circuit organization of this invention comprises, in general, an electronic transmitter that generates a relatively high audio frequency appearing across the secondary winding of a transformer. A receiver, including an electro-magnetic relay, is responsive to the voltage induced in the primary winding of another transformer associated with this receiver. The secondary winding of the transformer associated with the transmitter and the primary winding of the transformer associated with the receiver are connected in series across the track rails. This series circuit can be completed only by a shunt of the track rails as produced by a railway vehicle. With no track shunt, no energy can be coupled from the transmitter to the receiver so that the electromagnetic relay controlled by the receiver remains dropped away. It is only when the track rails are properly shunted that energy can be coupled from the transmitter to the receiver and result in the picking up of the track relay.

Because of the series circuit organization that is employed, the track relay is energized only when a vehicle is effective to shunt the track rails. Although this organization is contrary to the usual shunt track circuit system, it is particularly advantageous in a system for the control of a switch lock, for example. Whereas the usual track circuit is required to be fail-safe by providing an occupancy indication in the event of a circuit fault, a track circuit organization for use in the release of a switch lock should preferably indicate nonoccupancy in the event of failure so that the switch will not become improperly unlocked. The series electronic track circuit of this invention is fail-safe in this latter manner in that any circuit fault is most likely to result in inability to pick up the overlay track relay so that nonoccupancy of the track is indicated.

It is thus an object of this invention to provide an electronic track circuit organization which may be superimposed upon the usual track circuits employed in railway signaling practice without in any manner interfering with the operation of such usual track circuits.

Another object of this invention is to provide an electronic track circuit organization comprising self-contained means for generating a high alternating-current frequency for application to the track rails in cooperation with receiver means being responsive to this particular high frequency.

An additional object of this invention is to provide an electronic track circuit wherein the track circuit energization is provided by a transistor circuit organization.

Still another object of this invention is to provide an electronic track circuit having relatively uniform sensitivity characteristics over a predetermined length of track rail.

An additional object of this invention is to provide a system for the control of a switch lock comprising a series electronic track circuit superimposed upon the usual shunt type track circuit.

Other features, objects, and characteristic features of this invention will in part be obvious from the accompanying drawings and in part pointed out as the description of the invention progresses.

In describing this invention in detail, reference will be made to the accompanying drawings illustrating one specific embodiment of this invention. In these drawings:

Fig. 1 is a circuit diagram illustrating the electronic track circuit of this invention as it may be used in connection with a system for the control of a switch lock;

Fig. 2 illustrates graphically the sensitivity of the track circuit organization with respect to distance along the trackway; and Fig. 3 illustrates the use of inductors in the connections from the switchpoints to the main track rails.

To simplify the illustration and facilitate in the explanation, the various parts and circuits constituting the embodiment of this invention have been shown diagrammatically and certain conventional illustrations have been used to make it easy to understand the principles and manner of operation rather than to illustrate the specific construction and arrangement of parts that would be used in practice. The various relays and their contacts are shown in a conventional manner. Symbols are used to indicate connections to the terminals of batteries or other sources of electric current instead of showing all the wiring connections to these terminals. For example, the symbols (+) and (−) indicate connections to the opposite terminals of a source of low voltage such as is required for the operation of the various relays.

Stated briefly and without attempting to describe the scope of this invention in detail, it is proposed to provide a transistorized transmitter circuit organization which continually operates to provide an output at a relatively high audio frequency. The output of this transmitter can be coupled to the input of an associated receiver only when a coupling circuit is completed by the shunting of the track rails. The receiver rectifies the coupled energy which is then used to energize a track relay. When the electronic track circuit is used in conjunction with a system for the control of a switch lock as illustrated in Fig. 1, the energization of the track relay is effective, as will later be more fully described, to energize the lock magnet of a switch lock mechanism with the result that the switch can then be operated to its opposite position.

The transmitter 10 shown in Fig. 1 comprises an oscillator that includes the transistor 11. Although various types of transistors can be used in the oscillator stage of this transmitter 10, in one specific embodiment of this invention the transistor 11 was of the p-n-p junction type. The collector of this transistor is connected through a current-limiting resistor 12 to the negative terminal of a battery 13. The resistor 12 is by-passed by the capacitor 14 for the range of frequencies generated by this oscillator. The oscillator is thus what is commonly termed a grounded collector oscillator. The base of transistor 11 is connected through inductor 15 to the junction of voltage dividing resistors 16 and 17 which provide the proper operating bias for the base of transistor 11. Inductor 15 is shunted by the series-connected capacitors 18 and 19. Inductor 15 and the two capacitors 18 and 19 provide a parallel tuned circuit that is resonant to substantially the desired output frequency of the transmitter. A circuit path is provided from the emitter through resistor 20 to the junction of capacitors 18 and 19 for the purpose of supplying the required positive feedback to sustain oscillation. The alternating emitter current resulting from these oscillations passes through the primary winding 21 of a transformer T1.

The track circuit organization of this invention will operate satisfactorily over a relatively broad range of frequencies. A frequency of 10 kilocycles per second was used in one specific embodiment of this invention, but it should not be construed that the principles of this invention are in any way limited to the use of this particular frequency.

A push-pull parallel output stage is provided for amplifying the oscillations, and this output stage includes the transistors 22—25. The upper terminal of the secondary winding of transformer T1 is connected to the bases of the two transistors 22 and 23, while the lower terminal of this same secondary winding is connected to the bases of the transistors 24 and 25. The emitter of each of these transistors 22—25 is connected through a resistor such as resistor 26 associated with transistor 22 to a common wire 27 which is then connected over lead 28 to the mid-tap of the secondary winding 29 of transformer T1. Although various types of transistors can be used for this output stage, those used in the previously mentioned embodiment of this invention were also all of the p-n-p junction type.

The collectors of the transistors 22 and 23 are both connected to the upper terminal of the primary winding 30 of transformer T2. The collectors of the transistors 24 and 25 are similarly connected to the lower terminal of this same winding. The mid-tap of this primary winding 30 is connected over wire 31 to the (—) terminal of battery 13.

The receiver 33 includes the input transformer T3 whose secondary winding 34 is connected through coupling capacitor 35 to the opposite terminals of a tuned circuit including inductor 36 and capacitor 37. In parallel with this tuned circuit is a full-wave rectifier 38. Relay TR is connected across the output terminals of this rectifier 38, and the winding of this relay is shunted by the gain control potentiometer 39.

Inductor 36 and capacitor 37 are tuned to the transmitter frequency so that they present a high impedance to this frequency, but a relatively low impedance to other extraneous frequencies that might be coupled to the receiver. Such low impedance results in their being effectively shunted and prevented from being applied through the rectifier to energize the relay TR. Any energy at the transmitter frequency, however, that is coupled to the receiver 33 is rectified by the full-wave rectifier 38 so that a direct current is obtained for energization of relay TR.

A series circuit is provided that includes the secondary winding 40 of transformer T2, primary winding 41 of transformer T3, and tuning capacitor 42. This series circuit is connected across the track rails at a particular feed point designated FP in the drawing. When there is no railway vehicle occupying the track rails in the vicinity of the feed point FP, there is then a high impedance across the track rails at the location so that substantially none of the energy induced in the winding 40 can be coupled to the winding 41 and thus result in actuation of relay TR. However, when the track rails are shunted, there is a low impedance across the track rails at the feed point FP, and this permits the coupling of sufficient energy from winding 40 to winding 41 to result in the picking up of relay TR.

Potentiometer 39 shunting the winding of relay TR provides a means for adjusting the sensitivity of this relay. For maximum sensitivity, potentiometer 39 is adjusted to provide the maximum amount of resistance in parallel with the winding of relay TR. Although the sensitivity variation could also be provided by a potentiometer in series with the winding of this relay, the shunt arrangement shown in Fig. 1 is considered preferable. More specifically, a reduction of the shunting resistance to reduce sensitivity is accompanied by a decrease in the receiver's input impedance so that less voltage is induced in the primary winding of transformer T3. This further reduces the amount of energy applied to the relay winding so that varying the shunt resistance is an effective way of varying sensitivity.

In contrast, if a series potentiometer arrangement were used, a zero resistance would provide maximum sensitivity. An increase of series resistance would then tend to reduce sensitivity but the resulting increase in input impedance would then cause a greater voltage to be induced in the windings of transformer T3. This would tend to partially nullify the effect of varying the potentiometer setting. Also, the increased impedance in the over-all coupling circuit between transmitter and receiver would then be greater and this would reduce the effectiveness of an impedance change at the feedpoint resulting from a vehicle shunt.

The most marginal condition which should not result in actuation of the relay TR is that occurring when the track rails are, of course, not shunted near the feedpoint but with the ballast in a wet condition so as to result in the most ballast leakage since this condition of the ballast provides the lowest impedance across the track rails at the feedpoint when no train is present. In other words, despite the relatively low impedance at the feedpoint because of the wet ballast, the relay TR should not pick up because no train is present. On the other hand, the most marginal circumstance which should, however, be effective to cause relay TR to pick up occurs when the track rails are occupied in the vicinity of the feedpoint but the ballast is dry so that there is then no appreciable reduction of impedance at the feedpoint resulting from ballast leakage. In other words, the ballast, under these circumstances, contributes but little to the reduction of impedance at the feedpoint so that the shunting effect must be provided almost entirely by the vehicle.

The range of variation between these two marginal conditions is on the order of only two ohms. It follows then that the output impedance of the transmitter 10 and input impedance of receiver 33 must be of a very low value and all other impedances including the inductance of the feed wires to the track rails must be kept to a minimum or otherwise turned out so that the relatively small impedance change across the track rails can have the maximum effect in varying the amount of energy coupled from the transmitter to the receiver.

In practice, the value of capacitor 42 is so selected that an effective rail shunt at some predetermined distance from the feedpoint FP will result in a maximum current through the winding of relay TR. If capacitor 42 were adjusted to provide this maximum relay current with a shunt directly at the feedpoint, the relay current would then decrease to either side of the feedpoint and the relay would then drop away when the shunt was only at a relatively small distance from the feedpoint. It has been found that rail shunts will be effective to pick up the track relay over a suitable length of the track rails to either side of the feedpoint when the capacitor 42 is tuned with an artificial shunt placed at some distance such as 15 feet from the feedpoint. The manner in which relay current then varies with the distance of a shunt from the feedpoint is approximately as shown in Fig. 2. The relay current is at a maximum at approximately 15 feet to either side of the feedpoint and is somewhat below this maximum value directly at the feedpoint. The relay current still is maintained above the drop-away value of the track relay for shunts extending to approximately 50 feet on either side of the feedpoint. Consequently, the effective length of the track circuit may be on the order of 100 feet.

The relatively uniform sensitivity characteristics of the track circuit organization of this invention are also shown in Fig. 2. Thus, the current through the winding of relay TR is shown as varying only by a small amount as a test shunt is moved from the feedpoint to some appreciable distance on either side of the feedpoint. The current then drops more abruptly to a value below the relay drop-away value as the distance between shunt and feedpoint is further increased, thereby providing a fairly sharp demarcation of the track circuit's limits. Because of ballast leakage there is some finite value of impedance across the rails even with no shunting vehicle present. Consequently, there is at all times some current passing through the winding of relay TR.

These numerical values and the graph of Fig. 2 are presented merely to give an idea as to order of magnitude of certain of the variables involved in the track circuit organization of the present invention. Obviously, the amplitude and frequency of the transmitter's output signal and other factors greatly affect the quantitative values.

To illustrate one specific manner in which the electronic track circuit of this invention may be used in practice, Fig. 1 illustrates its use in conjunction with the control of an electric switch lock. The system as shown is particularly for use with an absolute-permissive-block signaling system. A switch machine SM is diagrammatically illustrated as controlling the movement of switch points that permit the movement of railway vehicles from the main line to a siding. The switch machine may be of the hand-throw type or may be a hand-operated electric switch machine. The protection afforded by the usual track circuit is extended to the switch fouling area on the siding by means of the customary jumper connections shown in Fig. 1. This usual shunt track circuit is shown as comprising a track battery TB and a track relay T connected to the rails at the respective ends of the track circuit demarcated by the usual insulated joints. It should be understood that coded track circuits may also be used with the overlay track circuit of this invention. The switch lock mechanism is associated with the switch machine and normally locks the switch points in the normal position for main line traffic. This prevents the switch from being operated to the reverse position unless certain conditions are met as will now be described.

The line wires designated 2HD, 5HD, and common are those normally provided in a signaling system of this kind for the control of the wayside signals 2 and 5, which govern the entrance of trains into the block between these two signal locations. Since APB systems of this kind are well-known in the art, the manner of operation of such a system will not be described in detail here. It is sufficient to note that the presence of energy on both wires 5HD and 2HD is indicative of the fact that there is then no train occupying the stretch of track between the signals 2 and 5.

Assuming that a train is occupying the siding and wishes to move onto the main track, it is first necessary that a padlock be removed from the switch lock mechanism. Removal of the padlock results in operation of various contacts within the switch lock mechanism as noted in Fig. 1. The opening of the normally closed contact 53 results in the deenergization of the lock normal switch repeater relay LNWP.

When the switch machine is in its normal position, relay LNWP is normally energized through a circuit that includes various contacts in the switch lock mechanism and also in the switch circuit controller. Contacts 54 and 55 in the switch circuit controller, are in their right-hand positions whenever the switch is in its normal position. Thus, a circuit is normally effective from (+), and including right-hand contact 54, back contact 56 of the lock magnet LM, normally closed contact 53 in the switch lock mechanism, back contact 57 of the time element relay TER, the winding of relay LNWP, and right-hand contact 55, to (−).

When removal of the padlock results in the dropping away of relay LNWP, the front contacts 58 and 59 are opened. This causes removal of the energy that is normally present on wire 5HD to the right of contact 59 and on wire 2HD to the left of contact 58. Under these circumstances, signals 2 and 5 are caused to display their most restrictive signal indication.

If there is no train occupying the block at this time between the signal 2 and 5 locations, there will then be energy on wire 5HD to the left of contact 59 and on wire 2HD to the right of contact 58. Thus, the closure of back contacts 59 and 58 will result in the picking up of both the relay WF and EF respectively. If both these relays are picked up, a circuit is then completed through front contact 60 of relay WF, front contact 61 of relay EF, through front contact 62 which was closed by removal of the padlock and the winding of the lock magnet LM, to (−). Thus, removal of the padlock results in an immediate energization of the lock magnet provided only that the stretch of track between the two opposing signals 2 and 5 is clear of traffic as indicated by the picking up of both the relays WF and EF. This energization of the lock magnet results in the release of a locking bar so that the switch machine SM may then be fully operated to the reverse position.

If, on the other hand, one or the other of the relays WF or EF does not become picked up upon the release of relay LNWP, this is an indication that there is then a train between the signal 2 and the signal 5 locations. A circuit is then completed through either back contact 60 of relay WF or through front contact 60 of this relay and back contact 61 of relay EF and then through back contact 63 of relay LNWP, back contact 64 of relay TR, the winding of the time element relay TER and the now closed contact 65 in the switch lock mechanism, to the terminal (−). The time element relay is so organized that it cannot be picked up following its energization until a preselected time interval has elapsed. This time interval may be on the order of five minutes or more. The interval is selected to be sufficiently long so that a train which had entered the block prior to the signals 2 and 5 becoming restrictive, would have sufficient time to reach the location of the siding. Any such train, upon having passed the location of the switch, will then have passed the switch so that the operation of the switch machine to the reverse position may safely be made. Accordingly, the picking up of the time element relay TER at the end of the waiting interval results in the closure of its front contact 66 so that a circuit can then be completed from (+), through this front contact 66, front contact 62, and the winding of the lock magnet LM, to (−).

When it is desired that the switch be operated to permit a move from the main line onto the siding, it is, of course, not necessary that such a move be delayed even though, at such time, one or the other of the relays WF or EF can obviously not be picked up. The track circuit means of this invention is therefore provided to indicate that the main line track is occupied immediately in approach of the switch, and the detection of such occupancy makes it possible to circumvent the waiting period normally required. Thus, the picked up condition of relay TR at such a time makes it possible for a circuit to be completed from (+), through front contact 67 of relay TR, front contact 62, and the winding of the lock magnet to (—). The switch is thus immediately released so that the switch points can be operated to the reverse position and thereby permit the move from the main track onto the siding.

Although a spurious shunt in the vicinity of the feedpoint FP can cause the picking up of relay TR and thereby result in an improper release of the switch lock mechanism, this action also halts traffic in either direction by causing signals 2 and 5 to both display their most restrictive indication. This actuation of the signals is accomplished by the opening of back contacts 70 and 71 of relay TR.

The track circuit organization has been so devised, particularly through the use of transistors in the transmitter 10 rather than electron tubes, to operate with a minimum of failures. Any circuit fault that occurs is, however, most likely to result in the failure of relay TR to pick up rather than to cause this relay to become steadily energized. For example, the failure of a transistor in the transmitter 10 or any open-circuiting of a wire or component in the transmitter 10 or receiver 33 will result in an inability to supply energy to the relay TR so that this relay will then remain dropped away. The only consequence of the failure of relay TR to pick up when the train is in the vicinity of the feedpoint FP is that it is then impossible to circumvent the waiting period timed by the time element relay TER. Failure of relay TR to pick up cannot result in disabling the entire system by putting the various signals to stop. This manner of operation is in contrast to that obtained if a shunt type of track circuit were employed. With such a system, a circuit fault is most likely to result in the dropping away of the normally energized track relay so as to give an indication of occupancy. This results in the open-circuiting of the signal control wires so that all traffic is halted.

When the electronic track circuit of this invention is used, as disclosed in Fig. 1, in a switch lock release system, the feedpoint FP must be sufficiently remote from the switch points to ensure that a vehicle on the siding cannot cause actuation of relay TR even though it may be within the fouling section and thus actuate the usual track circuit relay. When considered desirable, the connections from the switch points in the fouling section to the main track rails may include inductors 75 as shown in Fig. 3 to increase the impedance to the A.C. signal for shunts on the far side of the switch points.

Having described an electronic track circuit organization as used in a switch lock control system as one specific embodiment of this invention, it is desired to be understood that various modifications, adaptations, and alterations may be made to the specific form shown to meet the requirements of practice without in any manner departing from the spirit or scope of this invention.

What we claim is:

1. An overlay track circuit comprising, a pair of track rails, an electronic transmitter including an oscillator for generating an alternating current of a selected relatively high audio frequency, an electronic receiver tuned to said frequency and including an electromagnetic relay, said electromagnetic relay being connected to the output of said electronic receiver to be energized when an effective signal is received, an output transformer having primary and secondary windings, said primary winding being connected with the output of said transmitter, an input transformer having primary and secondary windings, said secondary winding being connected with the input of said receiver, a capacitor, and coupling circuit means connecting said secondary winding of said output transformer and said primary winding of said input transformer in series with said capacitor across said pair of track rails at a single selected feedpoint for producing an effective signal in the secondary winding of said input transformer for said receiver to actuate said electromagnetic relay only when said rails are shunted by a train in the vicinity of said single selected feedpoint.

2. A railway signaling system comprising, a stretch of track having an insulated track section and including a turnout track switch, a signal for governing traffic over said track section, a control circuit means for clearing said signal when in a closed condition, a track circuit including the rails of said insulated track section with a source of energy connected across the rails at one end and a track relay normally energized from said source connected across the rails at the other end, said track relay opening said signaling control circuit when it is de-energized, a switch lock mechanism connected to said turnout track switch and normally effective to lock said switch to prevent operation of said switch from its normal position for main line traffic, a lock magnet effective when energized to unlock said switch lock mechanism, an overlay track circuit means including an electronic transmitter generating a preselected relatively high audio frequency, a receiver tuned for said frequency, a capacitor, coupling circuit means connecting in series the output of said transmitter and the input of said receiver through said capacitor across said rails at a single selected feed-point in approach to said switch, an electromagnetic relay means connected to the output of said receiver and effectively actuated only when said track rails are shunted by a train in the proximity of said selected feed-point, and circuit means governed by said electromagnetic relay means for energizing said lock magnet to permit operation of said switch and also for simultaneously therewith opening said signal control circuit.

3. A track circuit organization comprising, a pair of track rails having insulated joints at spaced points to form a track section, a source of direct current energy connected across the rails at one end of said section and an electromagnetic direct current track relay across the rails at the other end of said section to be normally energized by said source and to be released when said rails are shunted by a train, a transmitter for generating an alternating current signal having a preselected relatively high audio frequency, an electronic receiver tuned to respond to said frequency to give a distinctive output, a capacitor, coupling circuit means connecting the output of said transmitter and the input of said receiver in series with said capacitor across said track rails at a single selected feedpoint in said track section, said coupling capacitor having a proper value for causing said receiver to give its distinctive output in response to said frequency only when said rails are shunted in the vicinity of said feedpoint and to provide a maximum distinctive output in response to the shunting of the track rails at a limited distance on either side of said single feedpoint, whereby said receiver is effective to give a distinctive output for rail shunts at limited distances on either side of said feedpoint but not over the entire length of said track section and operating independently and without effect on the operation of said direct current track relay.

4. In a track circuit organization, a pair of insulated track rails included in a track section and having an electrical energy source connected thereto at one end and a track relay at the other end, a transmitter for generating an alternating-current signal of a selected frequency, said transmitter including a transistor oscillator and a transistor amplifier organization, an output transformer having primary and secondary windings with said primary winding being connected with said transmitter, a receiver including an input transformer having primary and secondary windings, a tuned circuit coupled to the secondary winding of said input transformer and resonant to said selected frequency, a full-wave rectifier in parallel with said tuned circuit, an electromagnetic relay connected to the output of said rectifier and being energized by the output of said rectifier only when an effective input is received on the primary of said input transformer, a tuning capacitor, and coupling circuit means including said tuning capacitor for connecting the secondary winding of said output transformer and the primary winding of said input transformer in series across the track rails at a single selected location in said track section to cause an effective input to be supplied to said input transformer only when a rail shunt in the vicinity of said selected location produces an effectively resonant coupling of energy from said transmitter to said receiver.

References Cited in the file of this patent

UNITED STATES PATENTS

| | | |
|---|---|---|
| 1,094,894 | Hawkins | Apr. 28, 1914 |
| 1,152,448 | Stevens | Sept. 7, 1915 |
| 1,379,592 | Miller | May 24, 1921 |
| 2,069,870 | Baughman | Feb. 9, 1937 |
| 2,105,930 | Reichard | Jan. 18, 1938 |
| 2,347,833 | Laurenson | May 2, 1944 |
| 2,537,298 | Baughman | Jan. 9, 1951 |
| 2,549,146 | Van Horn | Apr. 17, 1951 |
| 2,604,581 | Johanek | July 22, 1952 |